US011483971B2

(12) United States Patent
Ricketts et al.

(10) Patent No.: US 11,483,971 B2
(45) Date of Patent: Nov. 1, 2022

(54) CUTTER BAR SUPPORT LINKAGE

(71) Applicant: CNH Industrial America LLC, New Holland, PA (US)

(72) Inventors: Jonathan Eugene Ricketts, Coal Valley, IL (US); Herbert M. Farley, Elizabethtown, PA (US); Wayne T. Flickinger, Oxford, PA (US); John Hinkle, York Springs, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/657,210

(22) Filed: Oct. 18, 2019

(65) Prior Publication Data
US 2021/0112715 A1 Apr. 22, 2021

(51) Int. Cl.
*A01D 41/14* (2006.01)
*A01D 43/06* (2006.01)

(52) U.S. Cl.
CPC ............. *A01D 41/14* (2013.01); *A01D 43/06* (2013.01)

(58) Field of Classification Search
CPC ...... A01D 41/14; A01D 43/06; A01D 75/285; A01D 34/283; A01D 61/002; A01D 61/02
See application file for complete search history.

(56) References Cited

U.S. PATENT DOCUMENTS

| 2,807,127 | A |   | 9/1957 | Scheidenhelm | |
|---|---|---|---|---|---|
| 3,142,375 | A |   | 7/1964 | Luke | |
| 3,982,383 | A |   | 9/1976 | Mott | |
| 4,162,606 | A | * | 7/1979 | Weichel | A01D 34/04 56/15.9 |
| 4,441,307 | A |   | 4/1984 | Enzmann | |
| 4,473,993 | A | * | 10/1984 | Jennings | A01D 34/28 56/192 |
| 4,573,308 | A | * | 3/1986 | Ehrecke | A01D 41/14 56/14.4 |

(Continued)

FOREIGN PATENT DOCUMENTS

| DE | 3829789 A1 | 3/1990 |
|---|---|---|
| DE | 9117195 U1 | 2/1997 |

(Continued)

OTHER PUBLICATIONS

European Search Report for European Application No. 18196312.5, dated Feb. 28, 2019, 8 pages.

*Primary Examiner* — Arpad Fabian-Kovacs
(74) *Attorney, Agent, or Firm* — Peter K. Zacharias; Patrick M. Sheldrake

(57) ABSTRACT

An agricultural vehicle header having a frame, at least one support arm extending, a cutter assembly attached to the distal ends of the support arms, a draper belt with an upper belt portion located above the support arms, and a parallel linkage connected to each support arm to operatively connect the cutter assembly to the frame. The linkage includes upper and lower links. The upper belt portion extends along a cross-belt direction that is perpendicular to a travel direction of the upper belt portion, and the proximal pivots of the upper and lower links are positioned on a line that is oriented at an angle of 60 to 120 degrees relative to the cross-belt direction when the header is in a freestanding static state.

22 Claims, 3 Drawing Sheets

(56) References Cited

U.S. PATENT DOCUMENTS

| | | | |
|---|---|---|---|
| 4,599,852 A * | 7/1986 | Kerber | A01D 41/14 56/15.8 |
| 4,742,671 A | 5/1988 | Bich | |
| 5,157,905 A | 10/1992 | Talbot et al. | |
| 6,250,055 B1 | 6/2001 | Franet | |
| 6,782,683 B2 * | 8/2004 | Buermann | A01D 41/14 56/257 |
| 7,802,417 B2 | 9/2010 | Sauerwein et al. | |
| 8,051,633 B2 | 11/2011 | Figgins et al. | |
| 8,601,779 B1 * | 12/2013 | Figgins | A01D 34/283 56/181 |
| 10,299,434 B2 | 5/2019 | Yanke et al. | |
| 10,582,660 B2 * | 3/2020 | Yanke | A01D 34/04 |
| 11,032,970 B2 | 6/2021 | Brimeyer et al. | |
| 2002/0059789 A1 * | 5/2002 | Koorn | A01D 43/107 56/16.4 A |
| 2003/0074876 A1 | 4/2003 | Patterson et al. | |
| 2007/0193243 A1 * | 8/2007 | Schmidt | A01D 57/20 56/181 |
| 2007/0204589 A1 * | 9/2007 | Coers | A01D 57/20 56/208 |
| 2008/0078155 A1 * | 4/2008 | Coers | A01D 41/141 56/15.8 |
| 2008/0276590 A1 * | 11/2008 | Sauerwein | A01D 41/14 56/153 |
| 2009/0277146 A1 * | 11/2009 | Sauerwein | A01D 34/13 56/208 |
| 2009/0277147 A1 | 11/2009 | Honas et al. | |
| 2009/0293441 A1 * | 12/2009 | Sauerwein | A01D 41/14 56/208 |
| 2010/0083629 A1 * | 4/2010 | Klotzbach | A01D 41/14 56/320.1 |
| 2014/0041352 A1 | 2/2014 | Johnson | |
| 2014/0041354 A1 * | 2/2014 | Coon | A01D 41/06 56/158 |
| 2017/0311545 A1 | 11/2017 | Walter | |
| 2018/0279549 A1 | 10/2018 | Lacy et al. | |
| 2019/0029176 A1 * | 1/2019 | Yanke | A01D 34/22 |
| 2019/0098831 A1 | 4/2019 | Yanke et al. | |
| 2021/0112713 A1 | 4/2021 | Martin et al. | |
| 2021/0112715 A1 | 4/2021 | Ricketts et al. | |

FOREIGN PATENT DOCUMENTS

| | | |
|---|---|---|
| EP | 2374344 A2 | 10/2011 |
| EP | 3610716 A1 | 2/2020 |
| GB | 1208285 | 10/1970 |
| WO | 9112709 A1 | 9/1991 |
| WO | 02102138 A1 | 12/2002 |

* cited by examiner

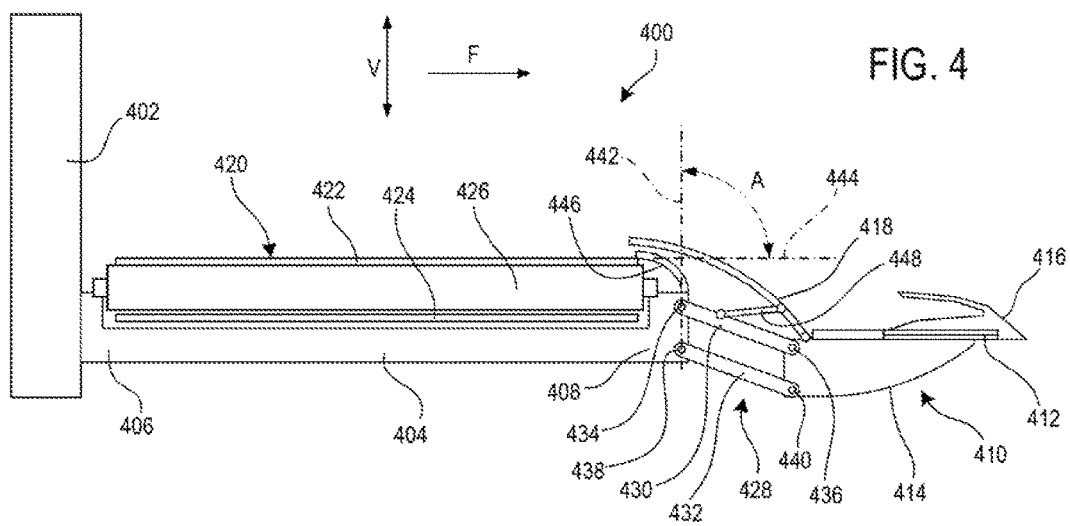
FIG. 4
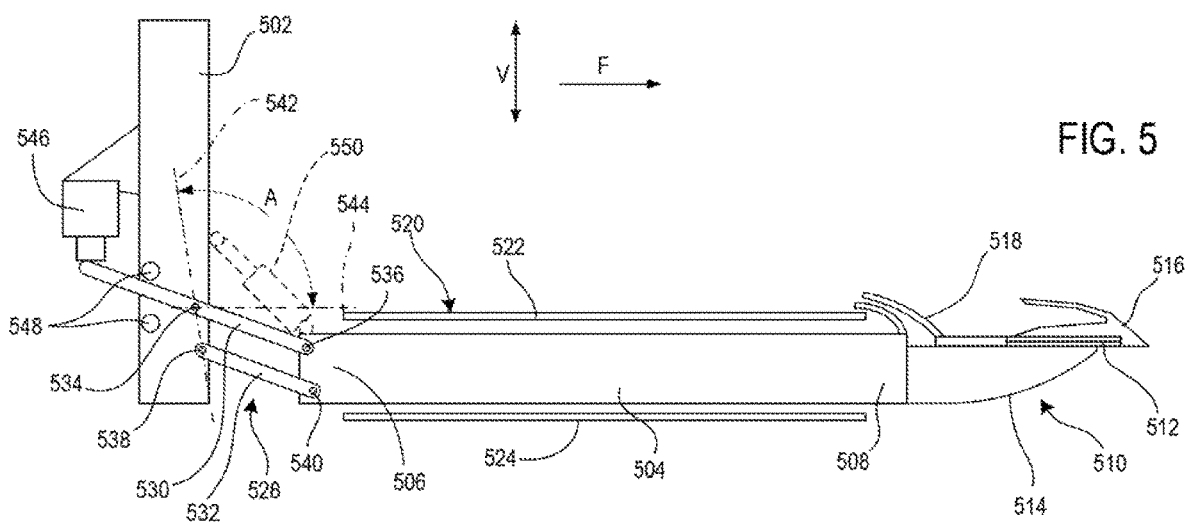
FIG. 5
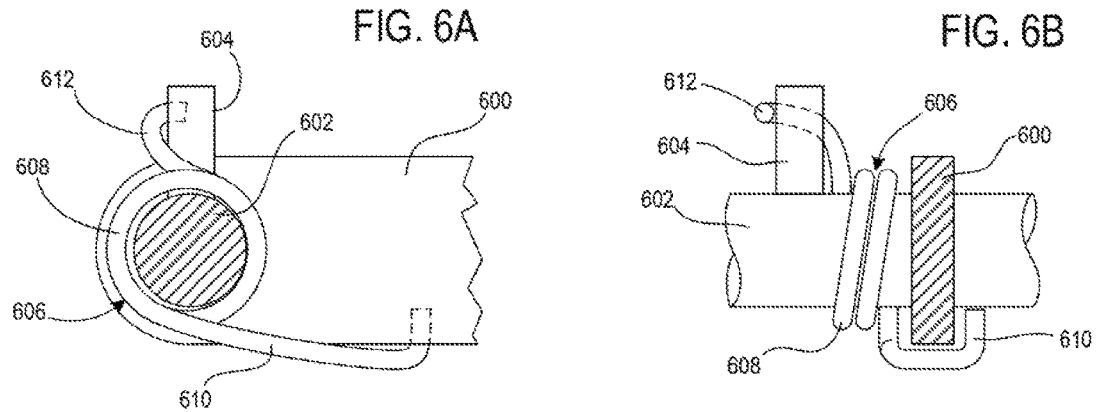
FIG. 6A
FIG. 6B

CUTTER BAR SUPPORT LINKAGE

BACKGROUND OF THE INVENTION

Agricultural equipment, such as combines, swathers and windrowers, typically include a header that is movably attached to the chassis of the vehicle. The header typically is located at the front of the vehicle, and extends laterally relative to the vehicle's forward direction of travel. In some cases, the header is a single rigid body. In other cases the header is a so-called multi-segment or articulated header comprising multiple sections that are movable relative to each other. For example, the header may have a center section located along the vehicle fore-aft centerline, and a wing section attached at, and extending laterally from, each lateral end of the center section. Devices such as hydraulic or pneumatic cylinders, mechanical linkages, and the like, may be provided to selectively control the heights of the center section and the wing sections.

During operation, the header might be raised or lowered to account for variations in the ground level, properties of the particular crop being harvested, and various other operating conditions. Thus, a typical header might be pivotally mounted to the vehicle chassis by way of a feeder housing that can be moved up and down to raise and lower the entire header. The header also may include a forward tilt adjustment mechanism that rotates the entire header forward and backward to change the angle of the header relative to the ground. Still further, the header might have a lateral tilt adjustment mechanism to rotate the header about the fore-aft axis to account for different ground levels in the lateral direction.

Such adjustments are useful for gross placement of the header, but often are not sufficient to maintain the cutter bar at a uniform height over continuously varying terrain. Thus, the cutter bar may be mounted on a movable support to move somewhat independently of the rest of the header. Still further the cutter bar may comprises a flexible cutter bar that is supported by multiple independently-movable supports along the lateral extent of the cutter bar. Thus, a flexible cutter bar can conform to lateral undulations in the terrain better than a rigid cutter bar.

Various flexible cutter bar support systems are known in the art. For example, U.S. Patent Pub. No. 2019/0098831 describes a cutter bar that is mounted on a linkage comprising uneven-length arms, so as to pivot about a point located below the cutter bar. In this arrangement, the pitch of the cutter bar changes as it moves up and down, which may reduce effectiveness. As another example, U.S. Pat. No. 4,441,307 shows a flexible cutter bar mounted on a series of parallel linkages. This permits a constant cutter bar pitch as it moves up and down, but the cutter bar moves through a large range of motion that does not appear suitable for use with a draper belt. Furthermore, the proximal ends of the two parallel links are anchored to the header at respective pivots that are oriented along a nearly horizontal line, which limits the upward range of motion, and requires a substantial amount of space to mount the cutter bar.

While prior art mechanisms show movable cutter bar supports, it has been found that the state of the art still requires development.

This description of the background is provided to assist with an understanding of the following explanations of exemplary embodiments, and is not an admission that any or all of this background information is necessarily prior art.

SUMMARY OF THE INVENTION

In one exemplary aspect, there is provided an agricultural vehicle header having: a frame extending in a lateral direction; at least one support arm extending from a respective proximal end at the frame to a respective distal end located forward of the frame; a cutter assembly attached to the respective distal end of each at least one support arm; a draper belt comprising an upper belt portion located above each at least one support arm, and a lower belt portion located below the upper belt portion; and a respective parallel linkage connected to each at least one support arm and operatively connecting the cutter assembly to the frame. The parallel linkage includes: an upper link extending from a proximal upper pivot to a distal upper pivot, and a lower link located below the upper link and extending from a proximal lower pivot to a distal lower pivot. The upper belt portion extends along a cross-belt direction that is perpendicular to a travel direction of the upper belt portion, and the proximal upper pivot and the proximal lower pivot are positioned on a line that is oriented at an angle of 60 to 120 degrees relative to the cross-belt direction when the header is in a freestanding static state.

In some exemplary aspects, the line is oriented at 90 degrees to the cross-belt direction when the header is in a freestanding static state.

In some exemplary aspects, the at least one support arm comprises a plurality of support arms.

In some exemplary aspects, the proximal upper pivot and the proximal lower pivot are located on the frame, and the distal upper pivot and the distal lower pivot are located on the respective proximal end of each at least one support arm.

In some exemplary aspects, a skid shoe is mounted to the at least one support arm.

In some exemplary aspects, the proximal upper pivot and the proximal lower pivot are located on the respective distal end of each at least one support arm, and the distal upper pivot and the distal lower pivot are located on the cutter assembly.

In some exemplary aspects, a skid shoe is mounted to the cutter assembly.

In some exemplary aspects, a belt guide extends from the cutter assembly to a position below the upper belt portion, such that an upwards movement of the cutter assembly places the belt guide into contact with the upper belt portion to move the upper belt portion with the cutter assembly.

In some exemplary aspects, a spring is operatively connected to the parallel linkage and configured to apply a biasing force to move the cutter assembly upwards in a vertical direction. The spring may be a mechanical spring or a gas spring. The spring may have an adjustable preload. A mechanical spring may have a first spring end in contact with the upper link or the lower link, and a second spring end in contact with a movable support.

In some exemplary aspects, the lower belt portion is located below the at least one support arm.

In another exemplary aspect, there is provided an agricultural vehicle comprising a chassis configured to move across a surface, and a header attached to the chassis. The header includes: a frame extending in a lateral direction, a plurality of support arms, each extending from a respective proximal end at the frame to a respective distal end located forward of the frame, a cutter assembly attached to the respective distal ends of the support arms, a draper belt comprising an upper belt portion located above the support arms, and a lower belt portion located below the upper belt portion, and a respective parallel linkage connected to each support arm and operatively connecting the cutter assembly to the frame. Each parallel linkage includes: an upper link extending from a proximal upper pivot to a distal upper pivot, and a lower link located below the upper link and extending from a proximal lower pivot to a distal lower pivot. The upper belt portion extends along a cross-belt direction that is perpendicular a travel direction of the upper belt portion, and the proximal upper pivot and the proximal lower pivot of each respective parallel linkage are positioned on a respective line that is oriented at an angle of 60 to 120 degrees relative to the cross-belt direction when the header is in a freestanding static state.

In some exemplary aspects, the respective lines are oriented at 90 degrees to the cross-belt direction when the header is in a freestanding static state.

In some exemplary aspects, the proximal upper pivot and the proximal lower pivot of each respective parallel linkage are located on the frame, and the distal upper pivot and the distal lower pivot of each respective parallel linkage are located on the respective proximal end of each of the support arms.

In some exemplary aspects, the proximal upper pivot and the proximal lower pivot of each respective parallel linkage are located on the respective distal end of each of the support arms, and the distal upper pivot and the distal lower pivot of each respective parallel linkage are located on the cutter assembly.

In some exemplary aspects, one or more springs are provided and configured to apply a biasing force to move the cutter assembly upwards in a vertical direction. The one or more spring may be mechanical springs or gas springs, and may have an adjustable preload.

BRIEF DESCRIPTION OF THE DRAWINGS

Embodiments of inventions will now be described, strictly by way of example, with reference to the accompanying drawings, in which:

FIG. 4 is a side view of a header illustrating an exemplary embodiment of a cutter bar support linkage.

FIG. 5 is a side view of a header illustrating another exemplary embodiment of a cutter bar support linkage.

FIGS. 6A and 6B show an exemplary spring configuration that may be used with a cutter bar support linkage.

In the figures, like reference numerals refer to the same or similar elements.

DETAILED DESCRIPTION OF THE DRAWINGS

Exemplary embodiments of the present invention provide cutter bar and draper support assemblies for headers for agricultural equipment, such as combines, swathers, windrowers, and the like. It will be appreciated that other embodiments may be used in other types of machines having a similar arrangement of parts, upon incorporation of the appropriate features of the inventions herein.

Figure 1:
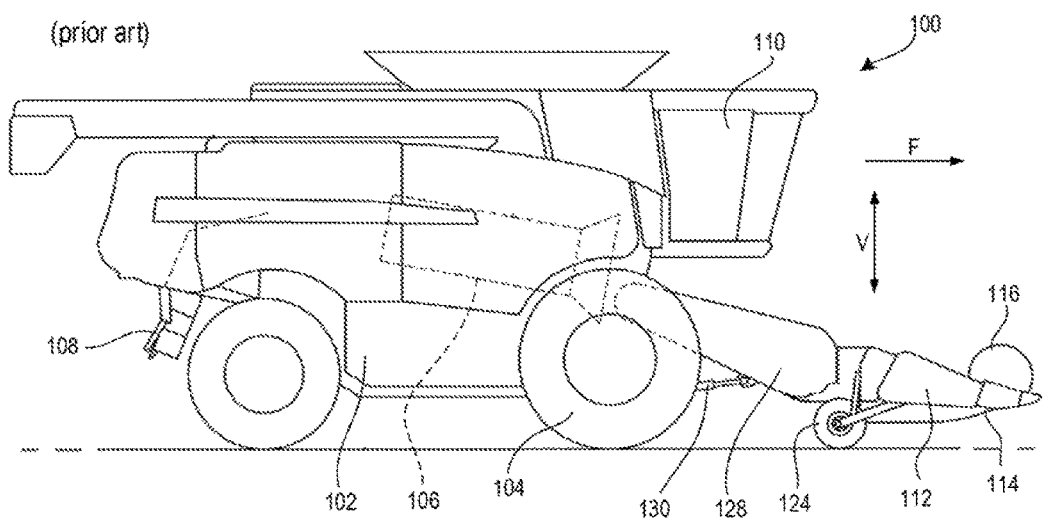
FIG. 1 is a side view of a prior art agricultural combine.

FIG. 1 illustrates an example of a prior art agricultural combine 100, with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper and unloader. Threshing and separating systems 106 and their associated components are well-known in the art, and need not be described in detail herein. The combine 100 also may include other features, such as a spreader 108, operator cab 110, and the like.

Figure 2:
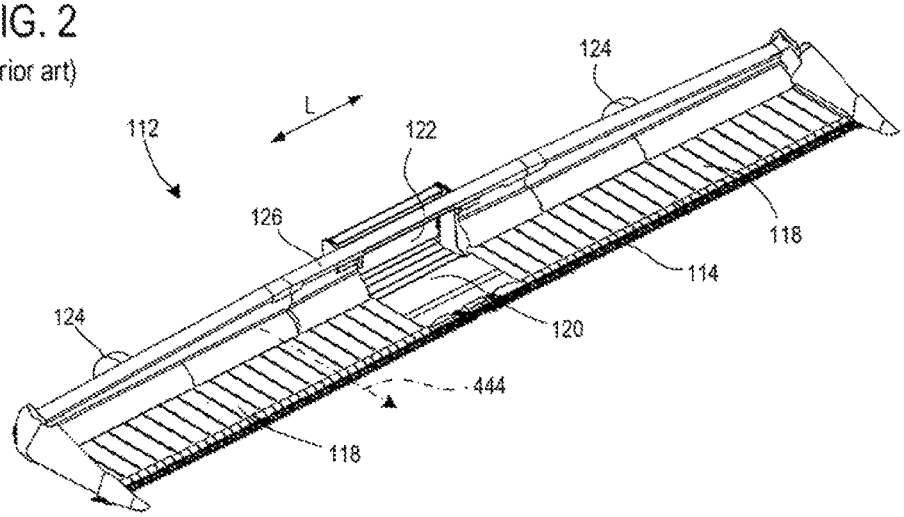
FIG. 2 is an isometric view of a prior art header.
Figure 3:
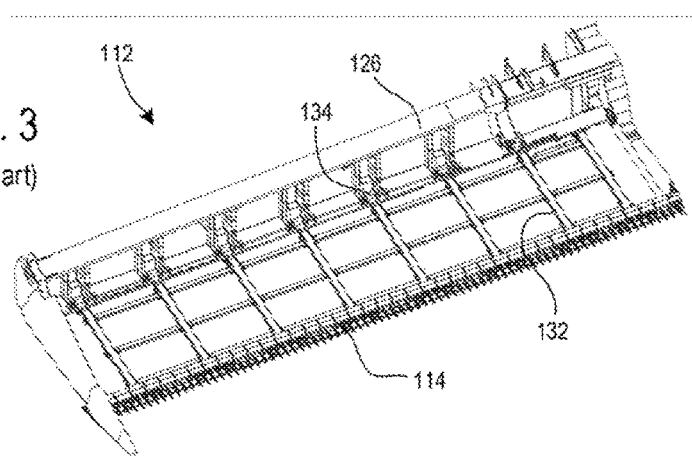
FIG. 3 is an isometric view of a portion of a prior art header frame.

Referring also to FIGS. 2 and 3, the combine 100 also includes a header 112, which is configured to cut and harvest crop material from the ground as the combine 100 drives in the forward direction F. For example, the header 112 may include one or more cutter bars 114 located at or near the leading edge of the header 112 to cut crops at or near the ground level, and one or more reels 116 configured to pull the crop material backwards towards the header 112. The header 112 also may include crop conveyors 118 that are configured to move the crop material at the lateral ends of the header 112 towards the center of the header 112. The crop conveyors 118 may be in the form of belts, auger screws, or the like. At the center, the header 112 may include a feeder conveyor 120 that conveys the crop material backwards towards a crop outlet 122. The header 112 also may include gauge wheels 124 or skids to control the height of the header 112 over the ground.

The header 112 is built on a frame 126, which is attached to the chassis 102 by a feeder housing 128. The feeder housing 128 is configured to convey crop material backwards from the header 112 to the threshing and separating system 106. The feeder housing 128 may be movable by one or more feeder housing actuators 130 to raise and lower the header 112 in a vertical direction V relative to the ground.

The illustrated exemplary header 112 is a unitary header having a single frame that extends continuously between the ends of the header 112 in the lateral direction L. In other embodiments, the header 112 may comprise a multi-segment or articulated header having a center section and one of more wing sections movably attached to the lateral end of the center section by pivots or linkages.

The header 112 also includes a number of support arms 132 that extend forward from the frame 126 to hold parts such as the cutter bar 114, conveyors 118, or the like. The support arms 132 may be rigidly attached to the header 112, or attached by movable mounts, such as pivots or linkages. In the case of movable support arms 132, a suspension may be used to control the motion of the support arms 132. For example, each support 132 may have its own spring and/or damper system, which is intended to allow the support arms 132 to move up and down individually or in groups to follow local undulations along the lateral direction L. As another example, each support arm 132 may be mounted by a flexible mount such as a torsion link 134 as described in U.S. Pat. No. 8,051,633, which is incorporated herein by reference. Skids, gauge wheels or other ground supports may be located below the support arms 132 to generate a lifting force via contact with the ground. The positions of the ground supports and the spring and damping properties of the movable connections may be adjustable to tailor the header 112 for use in particular operating conditions. In addition, the positions of the support arms 132, such as their angular orientation (downward tilt) relative to the frame 126 may be adjustable.

Referring now to FIG. 4, an exemplary embodiment of a header 400 having a cutter bar support linkage is shown in detail. The header 400 includes a frame 402 that extends in the lateral direction L (perpendicular to the plane of the page in FIG. 4), and one or more support arms 404 that extend from the frame 402 in the forward direction. Each support arm 404 extends from a proximal end 406 located at or closest to the frame 402, to a distal end 408 located remotely from and forward of the frame 402. FIG. 4 shows a single support arm 404, but it will be appreciated that multiple identical or similar arms may be located at spaced locations along the lateral direction L, such as shown in FIG. 3. In this example, the proximal end 406 of the support arm 404 is rigidly connected to the frame 402 by welds, fasteners, or the like.

A cutter assembly 410 is attached to the distal end 408 of the support arm 404. The cutter assembly 410 includes a cutting mechanism, such as a conventional cutter bar 412 or the like. The cutter assembly 410 also may include features such as a skid shoe 414, a cutter guard 416, and a crop guide plate 418. The cutter assembly 410 also may include, at one or more locations, a drive system (e.g. motor or a linkage to a motor) to operate the cutter bar 412. Cutter assemblies 410 are generally known in the art, and need not be described in more detail herein.

A draper belt 420 is located behind the cutter assembly 410, and has an upper belt portion 422 located above the support arm 404 and a lower belt portion 424 located below the upper belt portion 404. The upper belt portion 422 and lower belt portion 424 are parts of a single continuous belt that is configured to move crop material from the lateral extents of the header to the center of the header, for removal into the combine via a feeder housing or the like (see, e.g., FIG. 3 and the associated discussion above). The draper belt 420 may be a seamless belt, or it may be constructed of joined belt segments. The draper belt 420 also may comprise multiple belts operating in parallel (i.e., one belt behind the other with respect to the forward direction F). One or more of the support arms 404 also may include a roller 426, bearings, or a low-friction surface to support the upper belt portion 422. In the example of FIG. 4, both the upper belt portion 422 and the lower belt portion 424 are located above the support arm 404.

A parallel linkage 428 is connected to the support arm 404, and configured to allow the cutter assembly 410 to move up and down in the vertical direction V relative to the frame 402, through an arc defined by the lengths of the linkage arms. In this case, the parallel linkage 428 is connected between the distal end 408 of the support arm 404 and the cutter assembly 410. The parallel linkage 428 includes an upper link 430 and a lower link 432 located generally below the upper link 430. The upper link 430 extends from a proximal upper pivot 434 on the support arm 404, to a distal upper pivot 436 on the cutter assembly 410. The lower link 432 extends from a proximal lower pivot 438 on the support arm 404, to a distal lower pivot 440 on the cutter assembly 410. The upper link 430 and lower link 432 may each comprise one or more rigid bars.

The pivots 434, 436, 438, 440 may be formed by hinge pins, trunnions, or other suitable rotating connectors. One or more bearings or bushings may be provided within the pivots to reduce friction and wear between the parts. Being a parallel linkage, the four pivots are arranged in a parallelogram as viewed along the lateral direction. The pivots may define respective corners of a rectangle, square, rhombus, or a rhomboid shape. One or both of the upper link 430 and the lower link 432 may be adjustable (i.e., have an adjustable length) to adjust the relative lengths of the links and the relative positions of the pivots.

The parallel linkage 428 preferably is configured with the upper and lower links 430, 432 being spaced in a direction that is approximately perpendicular to a line defined by the upper belt portion 422. For example, the upper proximal pivot 434 and lower proximal pivot 438 may be positioned along a line 442 that is oriented at an angle A of 60 to 120 degrees, and more preferably 90 degrees, relative to the cross-belt direction 444. The cross-belt direction 444 is the direction that is parallel to the belt's upper belt portion 422, and perpendicular to the belt's travel direction (in FIG. 4, the travel direction is orthogonal to the page). The measurement of the angle A is intended to be done with the header 400 in a freestanding static state, in which the header 400 is lifted above the ground at a normal operating orientation, without external forces being applied to deflect the draper belt 420 (i.e., no external dynamic or static load on the header 400). If the draper belt 420 runs parallel to the header frame 402, then the cross-belt direction 444 will be perpendicular to the frame 402, but this is not strictly required.

This arrangement of the parallel linkage 428 is expected to be more advantageous than linkages that orient the proximal pivots along a horizontal line, such as in U.S. Pat. No. 4,441,307. For example, the vertical spacing of the pivots provides greater torsional load resistance to resist upward or downward angular deflection of the cutter assembly 410, because the upper and lower links 430, 432 act as spaced tension and compression rods to resist torsion.

In this embodiment, the cutter assembly 410 may be modified to accommodate its vertical travel relative to the draper belt 420 by providing an enlarged or flexible crop guide plate 418. The crop guide plate 418 preferably is positioned, throughout the range of motion of the cutter assembly 410, such that crop passing backwards from the cutter assembly 410 can reach the draper belt 420. The crop guide plate 418 may be, for example, a plate that is rigidly connected to rest of the cutter assembly 410. Alternatively, it may comprise a flexible sheet of material (e.g., metal sheet, canvas, polyamide fabric weave, or the like) that is secured to both the cutter assembly 410 and the support arm 404 (e.g., by being attached to a belt guard 446 that encloses the leading edge of the belt 420). As still another example, the crop guide plate 418 may be movably connected to maintain a relatively low profile as the cutter assembly 410 moves up and down. For example, the crop guide plate 418 may be pivotally connected to the cutter assembly 410, with a position control link 448 joining the crop guide plate 418 to the parallel linkage 428 to form an unequal-length four-bar linkage. Other alternatives and variations will be apparent to persons of ordinary skill in the art in view of the present disclosure.

FIG. 5 shows another exemplary embodiment of a header 500 having a cutter bar support linkage. In this case, the header 500 again includes a frame 502 that extends in the lateral direction L (perpendicular to the plane of the page in FIG. 5), and one or more support arms 504 that extend from the frame 502 in the forward direction. Each support arm 504 extends from a proximal end 506 located at or closest to the frame 502, to a distal end 508 located remotely from and forward of the frame 502. FIG. 5 shows a single support arm 504, but it will be appreciated that multiple identical or similar arms may be located at spaced locations along the lateral direction L, such as shown in FIG. 3. In this example, the proximal end 506 of the support arm 504 is movably connected to the frame 502 by the parallel linkage 528, as discussed in more detail below.

A cutter assembly 510 is rigidly attached to the distal end 508 of the support arm 504. As in the previous example, the cutter assembly 510 includes a cutting mechanism, such as a conventional cutter bar 512 or the like. The cutter assembly 510 also may include features such as a skid shoe 514, a cutter guard 516, a crop guide plate 518, and drive system components. In this case, the skid shoe 514 may be removed from the cutter assembly 514 and instead be attached directly to the support arm 504.

A draper belt 520 is located behind the cutter assembly 510. In this case, the position of the cutter assembly 510 is fixed relative to the draper belt 520, but some adjustment may be provided to selectively reorient the cutter assembly 510 relative to the draper belt 520 (e.g., an adjustable tilt mechanism). As before, the belt 520 has an upper belt portion 522 located above the support arm 504. In this case, however, the lower belt portion 524 is located below both the upper belt portion 522 and the support arm 504. One or more of the support arms 504 may include a roller or other supports to hold the draper belt 520.

As before, the parallel linkage 528 is connected to the support arm 504, and configured to allow the cutter assembly 510 to move up and down in the vertical direction V relative to the frame 502, through an arc defined by the lengths of the linkage arms. In this case, the parallel linkage 528 is connected between the frame 502 and the proximal end 506 of the support arm 504. Also as before, the parallel linkage 528 includes an upper link 530 and a lower link 532 located generally below the upper link 530. The upper link 530 extends from a proximal upper pivot 534 on the frame 502, to a distal upper pivot 536 on the support arm 504. The lower link 532 extends from a proximal lower pivot 538 on the frame 502, to a distal lower pivot 540 on the support arm 504. The upper link 530 and lower link 532 may each comprise one or more rigid bars. The pivots may be formed using any suitable rotating connector, and they are arranged in the shape of a rectangle, square, rhombus or rhomboid shape to provide the parallel linkage geometry.

The parallel linkage 528 preferably is configured with the upper and lower links 530, 532 being spaced in a direction that is approximately perpendicular to a line defined by the upper belt portion 522. In this example, the upper proximal pivot 534 and lower proximal pivot 538 are positioned along a line 542 that is oriented at an angle A of 60 to 120 degrees, and more preferably 90 degrees, relative to the cross-belt direction 544, as measured in a freestanding static state. Thus, the parallel linkage 528 provides a substantial resistance to bending loads while still allowing vertical motion of the support arm 504 and cutter assembly 510 relative to the frame 502.

In either of the foregoing embodiments, the static position and dynamic properties of the parallel linkage may be controlled using any suitable arrangement of springs, dampers, travel stops or the like. For example, as shown in FIG. 5, a pneumatic spring 546 (e.g., a deformable air bladder or telescoping piston and cylinder assembly filled with compressed gas) is positioned to apply a spring and damping force to one of the links 530, 532. The static position of the links 530, 532 can be adjusted by adding or removing gas from the piston chamber to change the preload pressure value, and the damping properties can be adjusted by incorporating damping orifices in the gas system, such as known in the art. Also, as shown in FIG. 5, travel stops 548 may be provided to delimit the range of motion of the links 530, 532.

FIGS. 6A and 6B show an alternative arrangement for providing a preload on the parallel linkage 528. In this case, a link 600 (upper or lower) is rotatably mounted to pivot relative to a shaft 602. The shaft 602 preferably lies along one of the parallel linkage's pivot locations, and may provide a hinge structure about which the link 600 rotates. For example, a bushing or bearing may be provided between the link 600 and the shaft 602 to allow smooth relative rotation between the parts. The shaft 602 is secured to the underlying structure, which may be, for example, the frame, support arm, or cutter assembly. A retaining pin 604 extends radially from the shaft, and a mechanical spring 606 extends between the retaining pin 604 and the link 600. The spring 606 is configured to generate a biasing force to the link 600. For example, the spring 606 may comprise a coil 608 that wraps around the shaft 602, a first arm 610 that hooks under the link 600, and a second arm 612 that hooks around the retaining pin 604. Thus, clockwise rotation of the link 600 (as seen in FIG. 6A) pulls the first arm 610 away from the second arm 612, to stretch the spring 606 and generate a restoring force to move the link 600 in the opposite direction. In use, the shaft 602 and spring 606 may be located at any of the linkage pivots. The spring 606 preferably is oriented to provide an upwards biasing force on the cutter assembly (e.g., lifting up on the link 600 to raise the cutter assembly), but this is not strictly required.

The embodiment of FIGS. 6A and 6B can be modified by making the shaft 602 selectively rotatable to different positions to provide an adjustable preload. For example, the shaft 602 may be mounted on bearings to allow it to rotate relative to the underlying structure, and a lock (e.g., a set screw) may be provided to hold the shaft 602 at different angular orientations. Thus, an operator can release the lock, rotate the shaft 602 to raise or lower the link 600, then secure the lock. The embodiment of FIGS. 6A and 6B can also be modified by adding a damper (e.g., a pneumatic or hydraulic damper), adding travel stops, and so on. Furthermore, the shaft 602 may be local to a single support arm, but more preferably extends to engage the respective links of a number of support arms. Thus, a single adjustment of the shaft 602 can simultaneously adjust the preload on multiple support arms.

It is also envisioned that a spring or damper may be provided without directly engaging the parallel linkage. For example, as shown in FIG. 5, a shock absorber 550 may be provided directly from the frame 502 to the support arm 504. As another example, a cantilevered leaf spring may be provided to extend from the support arm 404 to the cutter assembly 410, or from the frame 502 to the support arm 504. Other alternatives and variations will be apparent to persons of ordinary skill in the art in view of the present disclosure.

Figure 7:
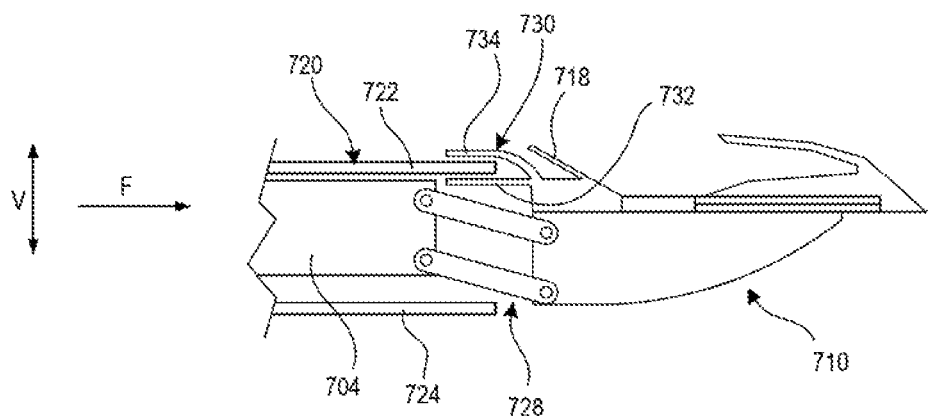
FIG. 7 is a side view of another exemplary cutter bar support linkage.

FIG. 7 shows another embodiment, in which the cutter assembly 710 is mounted to the distal end of the support arm 704 by a parallel linkage 728. In this case, the upper belt portion 722 of the draper belt 720 is located above the support arm 704, and the lower belt portion 724 is located below the support arm 704, and the parallel linkage 728 extends into the space between the upper belt portion 722 and the lower belt portion 724. The cutter assembly 710 includes a belt guide 730 that moves the front edge of the upper belt portion 722 up, and optionally down, as the cutter assembly 710 moves up and down on the parallel linkage 728. For example, the belt guide 730 may have a lower guide plate 732 that extends from the cutter assembly 710 to a location below the front edge of the upper belt portion 722. As the cutter assembly 710 moves up, the lower guide plate 732 pushes the draper belt 720 upwards. Similarly, an upper guide plate 734 may be provided to push the draper belt 720 back down as the cutter assembly 710 moves down. The belt guide 730 is expected to be useful to help prevent crop material from dropping between the front edge of the draper belt 720 and the cutter assembly 710. The cutter assembly 710 also may include a crop guide plate 718 (which may be separate from or integrated into the belt guide 730) to help direct the crop further back on the draper belt 720.

It will be appreciated that the upper and lower guide plates 734, 732 may extend continuously along the draper belt 720, or it may comprise intermittently spaced supports (e.g., one support at each support arm 704. The upper and lower guide plates 734, 732 also may comprise rollers or low-friction surface materials to help reduce friction with the moving draper belt 720. It will also be appreciated that the upper and lower guide plates 734, 732 may be adjustable, or mounted on movable linkages to move relative to the cutter assembly. For example, the lower guide plate 732 may comprise a protrusion extending upwards from the upper link of the parallel linkage 728.

Still further, It will also be appreciated that the links forming the parallel linkage 728 may be bent to help fit within the draper belt 720. For example, the lower link may be kinked to form a space to accommodate the front edge of the lower belt portion 724. The same is true for other embodiments, described herein, and it will be understood that the links forming the parallel links need not comprise straight and parallel arms, but instead simply require the pivots at the ends of the upper and lower links to be in a parallel relationship.

It will be appreciated that embodiments may include any combination of support arms and associated linkages. For example, a header may have a combination of assemblies as shown in FIGS. 4 and 5. One or more conventional support arms (either movable or fixed) may also be used in combination with one or more embodiments such as those described above. Other alternatives and variations will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. An agricultural vehicle header comprising:
   a frame extending in a lateral direction;
   at least one support arm extending from a respective proximal end at the frame to a respective distal end located forward of the frame;
   a cutter assembly attached to the respective distal end of each at least one support arm;
   a draper belt comprising an upper belt portion located above each at least one support arm, and a lower belt portion located below the upper belt portion; and
   a respective parallel linkage connected between each at least one support arm and the frame or between each at least one support arm and the cutter assembly, the parallel linkage comprising:
     an upper link extending from a proximal upper pivot to a distal upper pivot, and
     a lower link located below the upper link and extending from a proximal lower pivot to a distal lower pivot, wherein a first distance extending from the proximal upper pivot to the distal upper pivot is equal in magnitude to a second distance extending from the proximal lower pivot to the distal lower pivot, and a third distance extending from the proximal upper pivot to the proximal lower pivot is equal in magnitude to a fourth distance extending from the distal upper pivot to the distal lower pivot;
   wherein the upper belt portion extends along a cross-belt direction that is perpendicular to a travel direction of the upper belt portion, and the proximal upper pivot and the proximal lower pivot are positioned on a line that is oriented at an angle of 60 to 120 degrees relative to the cross-belt direction when the header is in a freestanding static state.

2. The agricultural vehicle header of claim 1, wherein the line is oriented at 90 degrees to the cross-belt direction when the header is in a freestanding static state.

3. The agricultural vehicle header of claim 1, wherein the at least one support arm comprises a plurality of support arms.

4. The agricultural vehicle header of claim 1, wherein the proximal upper pivot and the proximal lower pivot are located on the frame, and the distal upper pivot and the distal lower pivot are located on the respective proximal end of each at least one support arm.

5. The agricultural vehicle header of claim 4, further comprising a skid shoe mounted to the at least one support arm.

6. The agricultural vehicle header of claim 1, wherein the proximal upper pivot and the proximal lower pivot are located on the respective distal end of each at least one support arm, and the distal upper pivot and the distal lower pivot are located on the cutter assembly.

7. The agricultural vehicle header of claim 6, further comprising a skid shoe mounted to the cutter assembly.

8. The agricultural vehicle header of claim 6, further comprising a belt guide extending from the cutter assembly to a position below the upper belt portion, such that an upwards movement of the cutter assembly places the belt guide into contact with the upper belt portion to move the upper belt portion with the cutter assembly.

9. The agricultural vehicle header of claim 1, further comprising a spring operatively connected to the parallel linkage and configured to apply a biasing force to move the cutter assembly upwards in a vertical direction.

10. The agricultural vehicle header of claim 9, wherein the spring comprises a mechanical spring.

11. The agricultural vehicle header of claim 10, wherein the mechanical spring has an adjustable preload.

12. The agricultural vehicle header of claim 9, wherein the mechanical spring comprises a first spring end in contact with the upper link or the lower link, and a second spring end in contact with a movable support.

13. The agricultural vehicle header of claim 9, wherein the spring comprises a gas spring.

14. The agricultural vehicle header of claim 1, wherein the lower belt portion is located below the at least one support arm.

15. An agricultural vehicle comprising:
    a chassis configured to move across a surface; and
    a header attached to the chassis, the header comprising:
      a frame extending in a lateral direction,
      a plurality of support arms, each extending from a respective proximal end at the frame to a respective distal end located forward of the frame,
      a cutter assembly attached to the respective distal ends of the support arms,
      a draper belt comprising an upper belt portion located above the support arms, and a lower belt portion located below the upper belt portion, and a respective parallel linkage connected between each support arm and the frame or between each support arm and the cutter assembly, each parallel linkage comprising:
an upper link extending from a proximal upper pivot to a distal upper pivot, and
a lower link located below the upper link and extending from a proximal lower pivot to a distal lower pivot,
wherein a first distance extending from the proximal upper pivot to the distal upper pivot is equal in magnitude to a second distance extending from the proximal lower pivot to the distal lower pivot, and
a third distance extending from the proximal upper pivot to the proximal lower pivot is equal in magnitude to a fourth distance extending from the distal upper pivot to the distal lower pivot;
wherein the upper belt portion extends along a cross-belt direction that is perpendicular a travel direction of the upper belt portion, and the proximal upper pivot and the proximal lower pivot of each respective parallel linkage are positioned on a respective line that is oriented at an angle of 60 to 120 degrees relative to the cross-belt direction when the header is in a freestanding static state.

16. The agricultural vehicle of claim 15, wherein the respective lines are oriented at 90 degrees to the cross-belt direction when the header is in a freestanding static state.

17. The agricultural vehicle of claim 15, wherein the proximal upper pivot and the proximal lower pivot of each respective parallel linkage are located on the frame, and the distal upper pivot and the distal lower pivot of each respective parallel linkage are located on the respective proximal end of each of the support arms.

18. The agricultural vehicle of claim 15, wherein the proximal upper pivot and the proximal lower pivot of each respective parallel linkage are located on the respective distal end of each of the support arms, and the distal upper pivot and the distal lower pivot of each respective parallel linkage are located on the cutter assembly.

19. The agricultural vehicle of claim 18, further comprising a belt guide extending from the cutter assembly to a position below the upper belt portion, such that an upwards movement of the cutter assembly places the belt guide into contact with the upper belt portion to move the upper belt portion with the cutter assembly.

20. The agricultural vehicle of claim 15, further comprising one or more springs configured to apply a biasing force to move the cutter assembly upwards in a vertical direction.

21. The agricultural vehicle of claim 20, wherein the one or more springs comprise one or more mechanical springs.

22. The agricultural vehicle of claim 20, wherein the one or more springs have an adjustable preload.

* * * * *